United States Patent
Huang et al.

(10) Patent No.: US 8,703,017 B2
(45) Date of Patent: Apr. 22, 2014

(54) METHOD OF MODIFYING PHOSPHOR AND PHOSPHOR COMPOSITION AND MANUFACTURING METHOD OF THE SAME AND PHOSPHOR SOLUTION

(75) Inventors: Kuo-Tung Huang, Zhudong Township, Hsinchu County (TW); Yu-Ying Hsu, Puxin Township, Changhua County (TW); Bee-Yu Wei, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 180 days.

(21) Appl. No.: 13/337,634

(22) Filed: Dec. 27, 2011

(65) Prior Publication Data

US 2012/0168679 A1 Jul. 5, 2012

(30) Foreign Application Priority Data

Dec. 29, 2010 (TW) ............................... 99146677 A
Oct. 5, 2011 (TW) ............................. 100136171 A

(51) Int. Cl.
*C09K 11/02* (2006.01)
(52) U.S. Cl.
USPC ................... 252/301.4 F; 428/690; 428/404; 427/219; 427/69; 427/71; 252/301.4 P; 252/301.4 R
(58) Field of Classification Search
USPC ...................... 428/690, 404; 427/219, 64, 71; 252/301.36, 301.4 R–301.6 P
See application file for complete search history.

(56) References Cited

U.S. PATENT DOCUMENTS

| | | | |
|---|---|---|---|
| 5,200,233 A | 4/1993 | Mohacsi | |
| 5,277,840 A | 1/1994 | Osaka et al. | |
| 5,417,886 A | 5/1995 | Tateiwa et al. | |
| 5,523,655 A | 6/1996 | Jennato et al. | |
| 6,010,779 A * | 1/2000 | Picht et al. | 428/329 |
| 6,013,979 A * | 1/2000 | Picht et al. | 313/467 |
| 6,313,578 B1 | 11/2001 | Mishra et al. | |
| 6,417,611 B1 | 7/2002 | Picht et al. | |
| 6,531,074 B2 | 3/2003 | Trumble et al. | |
| 2012/0306354 A1* | 12/2012 | Seibel et al. | 313/503 |

FOREIGN PATENT DOCUMENTS

| | | |
|---|---|---|
| CN | 1156319 | 8/1997 |
| EP | 1 024 185 | 8/2000 |
| TW | M253896 | 12/2004 |

OTHER PUBLICATIONS

Fran, Y.S., et al.; "Preparation of Aluminum Film on Phosphor Screen for Field Emission Display;" Materials Chemistry and Physics 61; 1999; pp. 166-168.
English Abstract translation of CN101874094 (Published Oct. 27, 2010).

* cited by examiner

*Primary Examiner* — Carol M Koslow
(74) *Attorney, Agent, or Firm* — McClure, Qualey & Rodack, LLP

(57) ABSTRACT

A method of modifying a phosphor and a phosphor composition and a manufacturing method of the same and a phosphor solution are provided. The phosphor composition includes a silicone resin and a modified phosphor. The modified phosphor includes a phosphor and a nano-silica particle. The nano-silica particle is adhered to the phosphor. A weight ratio of the modified phosphor to the silicone resin is substantially between 1:0.005 and 1:0.1.

12 Claims, 2 Drawing Sheets

METHOD OF MODIFYING PHOSPHOR AND PHOSPHOR COMPOSITION AND MANUFACTURING METHOD OF THE SAME AND PHOSPHOR SOLUTION

This application claims the benefit of Taiwan application Serial No. 99146677, filed Dec. 29, 2010, and Taiwan application Serial No. 100136171, filed Oct. 5, 2011, the subject matters of which are incorporated herein by reference.

BACKGROUND OF THE DISCLOSURE

1. Field of the Disclosure

The disclosure relates in general to a method of modifying a phosphor and a phosphor composition and a manufacturing method of the same and a phosphor solution.

2. Description of the Related Art

The dispersed system of the phosphor of the general fluorescent lamp has to consider the factors such as: (1) the crystal size and shape of the phosphor could not be broken, (2) great adherence with the quartz tube, (3) the stability of the slurry being suited for coating, (4) high light conversion efficiency.

In the past, the nano-aluminum oxide of the phosphor dispersed system will not absorb the wavelength 254 nm light ray which is generated by the mercury of the low pressure mercury lamp to occur great conversion efficiency. But when the nano-aluminum oxide is applied to other lamp which is excited by shorter wavelength light, such as the fluorescent lamp excited by the vacuum ultraviolet, make the light conversion efficiency decrease. Because the nano-aluminum oxide may absorb the shorter wavelength light ray such as the predominant wavelength 74 nm light ray generated by the neon gas or the predominant wavelength 172 nm light ray generated by the xenon gas, the phosphor can only be excited by the residual vacuum ultraviolet to cause the light conversion efficiency decreasing.

Besides, using the silica particle as binding agent can improve the problem that the binding agent may absorb short wavelength light ray, but the coating stability of the phosphor dispersed system using silica as binding agent is not good enough, it is hard to form uniform coating layer. Therefore, it is a subject of the industrial endeavors to research the phosphor composition of high light conversion efficiency and uniform coating characteristic.

SUMMARY OF THE DISCLOSURE

The disclosure is directed to a method of modifying a phosphor, and a phosphor composition and a manufacturing method of the same, and a phosphor solution. The light conversion efficiency of the UV fluorescent lamp applied with the phosphor composition of the disclosure is improved by selecting the suitable binding agent.

According to embodiments of the present disclosure, a method of modifying a phosphor is provided. The method comprises following steps. A phosphor is added into a first aqueous solution and well mixed to obtain a first modified solution. A pH value of the first aqueous solution is less than or equal to 10. A plurality of oxide of silicon nanoparticles is mixed with the first modified solution to produce a second modified solution. The second modified solution is dried to produce a modified phosphor. A weight ratio of the phosphor to the oxide of silicon nanoparticles is substantially between 1:0.001 and 1:0.1.

According to embodiments of the present disclosure, a phosphor composition is provided. The phosphor composition comprises a silicone resin and a modified phosphor. The modified phosphor comprises a phosphor and a plurality of oxide of silicon nanoparticles. The oxide of silicon nanoparticles are adhered to the phosphor. A weight ratio of the modified phosphor to the silicone resin is substantially between 1:0.005 and 1:0.1.

According to embodiments of the present disclosure, a manufacturing method of a phosphor composition is provided. The method comprises following steps. A modified phosphor formed by the above method is provided. The modified phosphor and a silicone resin solution are mixed to obtain a phosphor solution. A weight ratio of the modified phosphor to the silicone resin solution is substantially between 1:0.01 and 1:0.2. The phosphor solution is dried to produce a phosphor composition.

According to embodiments of the present disclosure, a phosphor solution is provided. The phosphor solution comprises a silicone resin solution and a modified phosphor. A weight ratio of the modified phosphor to the silicone resin solution is substantially between 1:0.01 and 1:0.2. The modified phosphor comprises a phosphor and a plurality of oxide of silicon nanoparticles adhered to the phosphor. A weight ratio of the phosphor to the oxide of silicon nanoparticles is substantially between 1:0.001 and 1:0.1.

The above and other aspects of the disclosure will become better understood with regard to the following detailed description of the non-limiting embodiment(s). The following description is made with reference to the accompanying drawings.

DETAILED DESCRIPTION OF THE DISCLOSURE

The present disclosure discloses a phosphor composition. The phosphor composition comprises a silicone resin and a modified phosphor. The modified phosphor comprises a phosphor and a plurality of oxide of silicon nanoparticles adhered to the phosphor. The phosphor includes such as UV-A, UV-B, UV-C, visible light phosphor or a combination thereof. UV-B phosphor may include $SrB_6O_{10}$:Pb. UV-C phosphor may include $Ca_9Y(PO_4)_7$:Pr or $LaPO_4$:Pr. Examples of the silicone resin may comprise methyl silicone resin, ethyl silicone resin, propyl silicone resin, methyl phenyl silicone resin and a combination thereof. In one embodiment, a weight ratio of the modified phosphor to the silicone resin is substantially between 1:0.005 and 1:0.1, in another embodiment between 1:0.01 and 1:0.06. In one embodiment, in the phosphor composition, a weight ratio of the phosphor to the oxide of silicon nanoparticles is substantially between 1:0.001 and 1:0.1, in another embodiment between 1:0.005 and 1:0.05.

Figure 1:
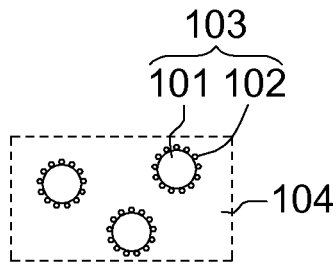
FIG. 1 is a schematic view showing the phosphor composition according to an embodiment of the disclosure.

Please refer to the FIG. 1, which is a schematic view showing the phosphor composition according to an embodiment of the disclosure. The phosphor composition 10 provided by the embodiment includes a silicone resin 104 and a modified phosphor 103. The modified phosphor 103 is mixed well with the silicone resin 104. The modified phosphor 103 includes the phosphor 101 and the oxide of silicon nanoparticles 102. The oxide of silicon nanoparticles 102 are attached to the phosphor 101 to proceed the modified adsorption by heterogeneous aggregation techniques such as the principle of the positive and negative charges attracted to each other. Silicone resin 104 make the modified phosphor 103 reach the highly stable dispersing state, and the phosphor composition 10 can be homogeneously coated on the surface of matter to form a layer with great adhesion; for example, the phosphor composition 10 could be homogeneously coated on the inner surface of the quartz tube. The following describes the method of manufacturing the modified phosphor.

Figure 2:
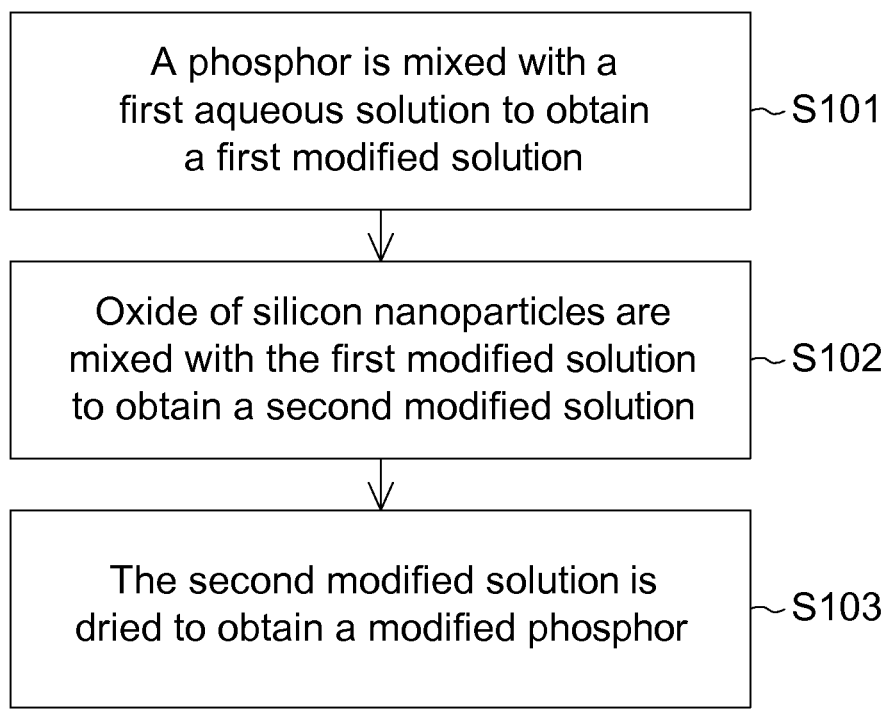
FIG. 2 is a flow chart showing a method for manufacturing a modified phosphor according to an embodiment of the disclosure.

The present disclosure discloses a method of modifying the phosphor. Please refer to the FIG. 2, which is a flow chart showing a method for manufacturing the modified phosphor according to an embodiment of the disclosure. In step S101, the phosphor is added into a first aqueous solution to obtain a first modified solution. The phosphor includes such as UV-A, UV-B, UV-C, visible light phosphor or a combination thereof. UV-B phosphor may include $SrB_6O_{10}$:Pb. UV-C phosphor may include $Ca_9Y(PO_4)_7$:Pr or $LaPO_4$:Pr. The phosphor may be mixed with the first aqueous solution by ultrasonic, agitation, shear mixing or soft mill method. The first aqueous solution may include methanol, ethanol, n-propanol, isopropanol, butanol or a combination thereof. Other solution (such as nitric acid or ammonia) could be added into the first aqueous solution to adjust the pH value of the first aqueous solution. The adjustment of the pH value of the first aqueous solution may change the zeta potential of the phosphor. In one embodiment, a pH value of the first aqueous solution is less than or equal to 10. In another embodiment, the pH value of the first aqueous solution may be 2~10, 2~8.6, 2~7, or 2.5~5.

In step S102, the oxide of silicon nanoparticles are mixed with the first modified solution to obtain a second modified solution. The oxide of silicon nanoparticles may include nano-silica particles. Examples of the precursor of the oxide of silicon nanoparticles include tetraethoxysilane (TEOS), tetramethoxysilane (TMOS), tetrapropoxysilane (TPOS), and tetrabutoxysilane (TBOS). In an embodiment, the oxide of silicon nanoparticles which have the diameter less than 100 nm may be made by a Sol-Gel method. In another embodiment, the diameter of the oxide of silicon nanoparticles is between 20 nm and 80 nm.

In step S103, the second modified solution is dried to obtain the modified phosphor. The modified phosphor is the phosphor encapsulated tightly by the oxide of silicon nanoparticles. In one embodiment, in the modified phosphor, a weight ratio of the phosphor to the oxide of silicon nanoparticles is substantially between 1:0.001 and 1:0.1, in another embodiment, between 1:0.005 and 1:0.05.

Figure 3:
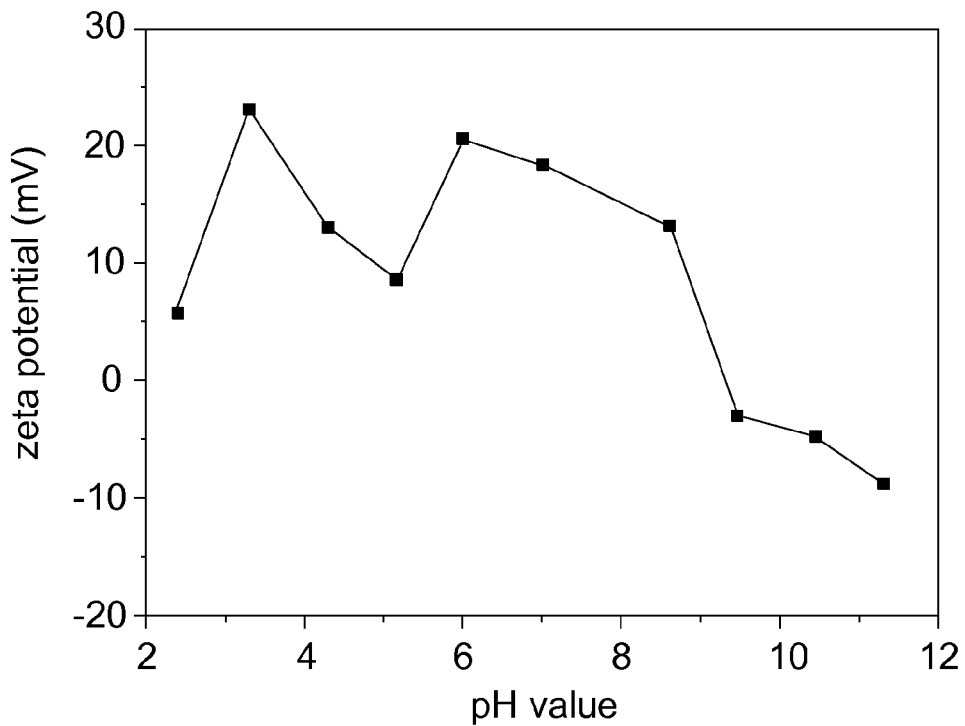
FIG. 3 is a coordinate diagram showing the relationship between the pH value of the first aqueous solution and the zeta potential of the phosphor.

Please refer to the FIG. 3, which is a coordinate diagram showing the relationship between the pH value of the first aqueous solution and the zeta potential of the phosphor in one embodiment. In this figure, the x-coordinate represents the pH value of the first aqueous solution, and the y-coordinate represents the zeta potential of the phosphor with the unit of millivolt (mV). The selected first aqueous solution in FIG. 3 may, for example, include isopropanol. It is indicated from the FIG. 3 that the phosphor in the first aqueous solution has corresponding zeta potential according to the different pH value of the first aqueous solution. When the pH value of the first aqueous solution is less than or equal to 8.6, the positive zeta potential of the phosphor is observed. For example, when the pH value of the first aqueous solution is between 2.4 and 8.6, the positive zeta potential of between 10 mV and 25 mV of the phosphor is observed. When the pH value of the first aqueous solution greater than or equal to 9.45, a negative zeta potential of the phosphor is observed. It is noted that FIG. 3 is merely for illustration of one embodiment, and the relationship between the pH value of the first aqueous solution and the zeta potential of the phosphor as shown in FIG. 3 could be varied according to the different conditions of applications (e.g., selecting different first aqueous solutions). In this embodiment, the pH value of the first aqueous solution is adjusted to less than or equal to 8.6 to make the zeta potential of the phosphor be positive in the first aqueous solution (not limited to positive zeta potential).

Figure 4:
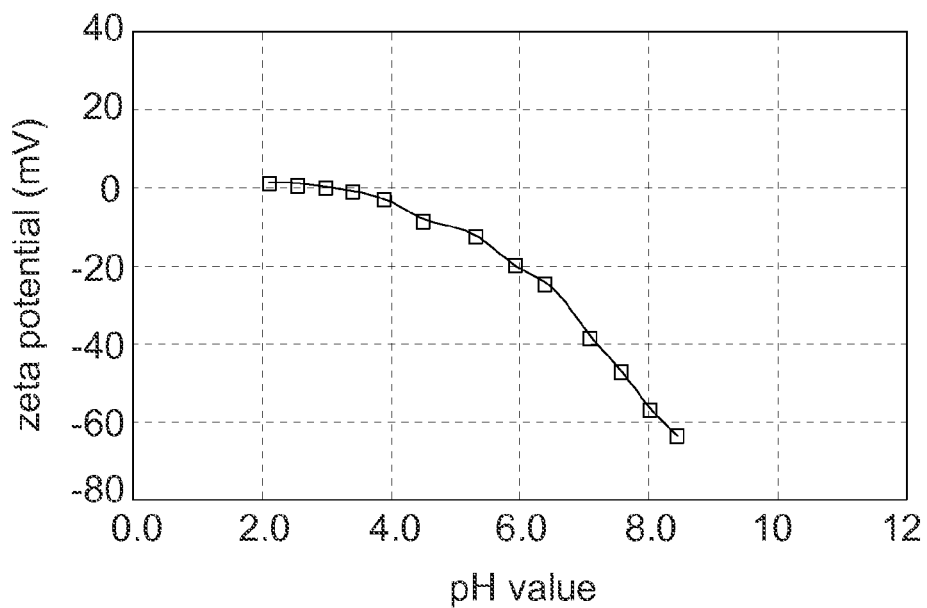
FIG. 4 is a coordinate diagram showing the relationship between the pH value of the second aqueous solution and the zeta potential of the oxide of silicon nanoparticles.

In one embodiment, the oxide of silicon nanoparticles may be mixed with a second aqueous solution. The second aqueous solution may comprise methanol, ethanol, n-propanol, isopropanol, butanol or a combination thereof. Other solution (such as nitric acid or ammonia) may be further added into the second aqueous solution to adjust the pH value of the second aqueous solution. Adjustment of the pH value of the second aqueous solution may modify the zeta potential of the oxide of silicon nanoparticles. Please refer to the FIG. 4, which is a coordinate diagram showing the relationship between the pH value of the second aqueous solution and the zeta potential of the oxide of silicon nanoparticles. In this figure, the x-coordinate represents the pH value of the second aqueous solution while the y-coordinate represents the zeta potential of the oxide of silicon nanoparticles with the unit of millivolt (mV). The selected second aqueous solution in FIG. 4 may, for example, include isopropanol. The oxide of silicon nanoparticle also has corresponding zeta potential according to the different pH value of the second aqueous solution. When the pH value of the second aqueous solution is greater than 2, the negative zeta potential of the oxide of silicon nanoparticles has been observed. When the pH value of the second aqueous solution is between 2 and 8.5, the zeta potential of the oxide of silicon nanoparticles decreases as the pH value of the second aqueous solution increases. It is noted that FIG. 4 is merely for illustration of one embodiment, and the relationship between the pH value of the second aqueous solution and the zeta potential of the oxide of silicon nanoparticles as shown in FIG. 4 could be varied according to the different conditions of applications (i.e. selecting different second aqueous solutions). In the embodiment, the zeta potential of the oxide of silicon nanoparticles may be negative to attract the phosphor which has positive zeta potential. Alternatively, in another embodiment, the zeta potential of the oxide of silicon nanoparticles may be positive and be attracted to the phosphor having the negative zeta potential. In this embodiment, the nano-silcia particles are dispersed in the second aqueous solution. The pH value of the second aqueous solution may be between 3 and 8 to make the zeta potential of the oxide of silicon nanoparticles be negative in the second aqueous solution (not limited to negative zeta potential). Accordingly, the negative zeta potential oxide of silicon nanoparticles are mixed with the first modified solution to attract the phosphor which has positive zeta potential in the first modified solution to obtain the second modified solution.

The present disclosure discloses a manufacturing method of the phosphor composition. The modified phosphor and a silicone resin solution are mixed to obtain a phosphor solution. Then, the phosphor solution is dried to produce a phosphor composition. A weight ratio of the modified phosphor to the silicone resin solution is substantially between 1:0.01 and 1:0.2.

In one embodiment, the modified phosphor may be manufactured by the above method of modifying the phosphor. The silicone resin solution comprises a silicone resin and a first solvent, methanol, ethanol, n-propanol, butanol or a combination thereof. The first solvent may comprise an organic solvent such as isopropanol. Examples of the silicone resin may comprise methyl silicone resin, ethyl silicone resin, propyl silicone resin, methyl phenyl silicone resin and a combination thereof.

In another embodiment, the phosphor solution may further comprise a nitrocellulose solution. The nitrocellulose solution may comprise a nitrocellulose and a second solvent. The second solvent may comprise an organic solvent such as butyl acetate.

The present disclosure discloses a phosphor solution. The phosphor solution comprises a modified phosphor and a silicone resin solution. A weight ratio of the modified phosphor to the silicone resin solution may be substantially between 1:0.01 and 1:0.2. The modified phosphor comprises a phosphor and oxide of silicon nanoparticles. The oxide of silicon nanoparticles are adhered to the phosphor. In one embodiment, in the modified phosphor, a weight ratio of the phosphor to the oxide of silicon nanoparticles is substantially between 1:0.001 and 1:0.1, in another embodiment, between 1:0.005 and 1:0.05. The modified phosphor may be manufactured by the above method of modifying the phosphor. The silicone resin solution comprises a silicone resin and a first solvent. The first solvent may comprise an organic solvent such as isopropanol, methanol, ethanol, n-propanol, butanol or a combination thereof. Examples of the silicone resin may comprise methyl silicone resin, ethyl silicone resin, propyl silicone resin, methyl phenyl silicone resin and a combination thereof.

In another embodiment, the phosphor solution may further comprise a nitrocellulose solution. The nitrocellulose solution may comprise a nitrocellulose and a second solvent. The second solvent may comprise an organic solvent such as butyl acetate.

In one embodiment, in the phosphor solution, a weight ratio of the modified phosphor to the silicone resin solution to the nitrocellulose solution is substantially between 1:0.01:0.3 and 1:0.2:2, or between 1:0.02:0.3 and 1:0.12:1.5. In addition, in one embodiment, in the modified phosphor, a weight ratio of the phosphor to the oxide of silicon nanoparticles is substantially between 1:0.001 and 1:0.1, or between 1:0.005 and 1:0.05.

The density of the phosphor solution may be adjusted to be in a range between 0.5 g/cm$^3$ and 3 g/cm$^3$. In some embodiments, the density of the phosphor solution may be adjusted to be in a range between 1 g/cm$^3$ and 1.5 g/cm$^3$. The silicone resin in the phosphor solution may act as a binding agent to make the modified phosphors attract to each other and cause great anchor effect on the oxide of silicon nanoparticles and the silicone resin. The silicone resin in the phosphor solution may also make the modified phosphor disperse uniformly.

The phosphor solution is dried to obtain the phosphor composition. For example, after the phosphor solution is adhered to (for example, coated on) a matter, for example, on the surface of the quartz tube (fluorescent lamp), the phosphor solution is dried to obtain the phosphor composition. In an embodiment, in the phosphor composition, a ratio of the weight of the phosphor to the weight of the oxide of silicon nanoparticles is substantially between 1:0.001 and 1:0.1. In another embodiment, a ratio of the weight of the phosphor to the weight of the oxide of silicon nanoparticles is substantially between 1:0.005 and 1:0.05. Also, in an embodiment, a ratio of the weight of the modified phosphor to the weight of the silicone resin is substantially between 1:0.005 and 1:0.1.

In another embodiment, a ratio of the weight of the modified phosphor to the weight of the silicone resin is substantially between 1:0.01 and 1:0.06.

In the embodiment, the nitrocellulose solution in the phosphor solution may be used to adjust the density of the phosphor solution, so as to further control the thickness of the phosphor composition. For example, when the amount of the nitrocellulose solution in the phosphor solution decreases, the density of the phosphor solution increases, thereby increasing the thickness of the phosphor composition after drying the phosphor solution. Similarly, when the amount of the nitrocellulose solution in the phosphor solution increases, the density of the phosphor solution decreases, thereby decreasing the thickness of the phosphor composition after drying the phosphor solution. It is noted that the amount of the nitrocellulose solution in the phosphor solution has to be in a moderate extent. Excess or insufficient amount of nitrocellulose solution added in the phosphor solution would cause the phosphor solution unable to flow or draindown, respectively. In the procedure of drying the phosphor solution, the nitrocellulose solution is vaporized due to the high temperature sintering, and does not leave the ash which may affect the transmittance of the product.

In one embodiment, the density of the phosphor solution is adjusted to be in a range between 0.5 g/cm$^3$ and 3 g/cm$^3$ by the nitrocellulose solution. The phosphor coating layer is about 10 μm~35 μm, or about 15 μm~25 μm.

The phosphor composition provided in the embodiment may be applied in a field of excited by an ultraviolet or a vacuum ultraviolet to emit light and presents great irradiance. Also, the phosphor composition excited by other energy particles (e.g., electron beam etc.) may obtain the same or similar effect of the disclosure. In this embodiment, the vacuum ultraviolet may be excited by the xenon gas. Alternatively, in another embodiment, the ultraviolet or the vacuum ultraviolet may also be excited by the helium gas, neon gas, argon gas, krypton gas, radon gas, nitrogen gas, hydrogen selenide, deuterium, fluorine gas, chlorine gas, bromine gas, iodine gas or a combination thereof. Also, other discharge gases able to provide ultraviolet or vacuum ultraviolet could be used in the disclosure and have the same or similar effects of the disclosure. The phosphor composition may be excited by the ultraviolet or vacuum ultraviolet to emit light such as UV-A, UV-B, UV-C or visible light.

The binding agent is selected from the aluminum oxide or the calcium pyrophosphate in general phosphor composition. However, both of the aluminum oxide and the calcium pyrophosphate have strong absorption for the vacuum ultraviolet. When the vacuum ultraviolet is transmitted to the phosphor composition, most of the vacuum ultraviolet would be absorbed by the aluminum oxide or the calcium pyrophosphate, and the phosphor is excited by only a little portion of vacuum ultraviolet to emit light. The phosphor composition uses the silicone resin as the binding agent in the embodiment, and the silicone resin does not absorb a lot of vacuum ultraviolet. When the vacuum ultraviolet is transmitted to the phosphor composition in the embodiment, the phosphor may be excited by most of the vacuum ultraviolet to emit other lights, thereby improving the light conversion efficiency. Also, the organic part of the silicone resin will be decomposed at high temperature sintering, thereby having no effect on the luminous efficiency.

Table 1 shows the results of irradiance data, measured from different binding agents coated on the surface of the quartz glass and excited by 172 nm wavelength vacuum ultraviolet light. In table 1, the binding agents include the silicone resin of the embodiment, the aluminum oxide and the calcium pyrophosphate. The blank quartz glass irradiance in table 1 represent the irradiance data of the quartz glass which does not be coated any binding agent yet. Table 1 indicates that the quartz glass with the aluminum oxide and the calcium pyrophosphate coated thereon as binding agents have the irradiance of 2.1 and 0.1 mW/cm$^2$, respectively, which are not good enough. The quartz glass with the silicone resin coated thereon as binding agent (the embodiment) has the irradiance of 12.1 mW/cm$^2$, which is very good.

TABLE 1

| Binding agent | Irradiance of blank quartz glass (mW/cm$^2$) | Irradiance after coated with binding agent (mW/cm$^2$) |
|---|---|---|
| nano-aluminum oxide | 16.5 | 2.1 |
| calcium pyrophosphate | 16 | 0.1 |
| Silicone resin | 15.6 | 12.1 |

There are manufacturing example 1, examples 1-2, and comparative examples 1-3 to describe the data difference between the phosphor compositions made from different binding agents when these phosphor compositions are applied.

Manufacturing Example 1

Manufacturing of Oxide of Silicon Nanoparticles

First, nitric acid is added to the DI water to adjust the pH value of the aqueous solution to 4. Iso-propanol as co-solvent is added into the aqueous solution. A colloidal solution is prepared by adding tetraethoxysilane to the aqueous solution, and the hydrolysis reaction is processed for 4 hours in 60° C. to obtain nano-silica particles. The molar ratio of tetraethoxysilane, water and isopropanol is 1:2:4. Then, the pH value of the colloidal solution is adjusted to 3.0±0.2 and the solid content thereof is adjusted to 14% by adding nitric acid. The particle diameter test and the charge test for the nano-silica particles of the colloidal solution are conducted, and the test results of diameter and zeta potential of nano-silica particles are 70 nm and −7 mV, respectively.

Example 1

An 50 g of isopropanol solution is provided and 4.5 g of UV-C phosphor ($Ca_9Y(PO_4)_7$:Pr) is added to the isopropanol solution. The pH value of the isopropanol solution is adjusted to 3.3±0.2 by adding nitric acid. The isopropanol solution is dispersed by ultrasonic for 30 minutes and the colloidal solution 0.33 g of the manufacturing example which has solid content 14% is added. After agitate 1 hour agitation, this solution is then filtered and dried at 200 to obtain the modified phosphor. The modified phosphor is added and well mixed with 4.5 g of nitrocellulose butyl acetate solution having solid content 1%, followed by addition of 0.36 g of methyl isopropanol silicon resin solution having solid content 50% (KR242A purchased from Topco Technologies Corp.). After 4 hours soft mill, a phosphor solution is obtained.

The phosphor solution is coated on the inner wall of the synthesized quartz tube which has the length thereof being 150 mm and the inner and outer diameters thereof being 14 mm and 16 mm. After the phosphor solution is dried on the inner wall of the synthesized quartz tube by blowing hot air, the organic material and the solvent in the phosphor solution are decomposed and oxidized by high temperature baking. After the temperature of the baking temperature reach about 600 for about 6 minutes, the heating step is terminated and the quartz tube is taken out after cooling down. It is observed that the phosphor composition layer is coated on the inside wall of the quartz tube. The thickness of the phosphor composition is substantially 3 mg/cm$^2$ (about 18~22 μm) by measuring the value of the weight of the phosphor composition coated on the quartz tube dividing the inner surface of the quartz tube. Then, the quartz tube is filled with the xenon gas of 400 torr and sealed. By sending an electrical discharge through the xenon gas in the quartz tube, the xenon gas is excited to emit a photon of a characteristic energy, resulting in the vacuum ultraviolet radiation. Measurements of the UV-C irradiance are conducted herein, at different electric powers (30 W and 80 W) applied to the quartz tube. The results of measurements are listed in table 2.

Example 2

The example 2 is conducted by the procedures similar with the example 1, except the amount of the colloidal solution including nano-silica in the manufacturing example 1 and the amount of the isopropanol silicone resin solution are changed to 0.65 g and 0.27 g respectively. Those similar parts are not described redundantly.

Comparative Example 1

4 g of nitrocellulose solution having solid content 1% is provided and 4.5 g of UV-C phosphor ($Ca_9Y(PO_4)_7$:Pr) is added into the nitrocellulose solution. 0.23 g of nano-aluminum oxide solution having solid content 20% and 1.2 g of calcium pyrophosphate binding agent having solid content 15% are then further added into the solution to form a mixture. After soft mill and dispersing the mixture for 4 hours, a phosphor solution is obtained.

The phosphor solution is coated on the inner wall of the synthesized quartz tube which has the length thereof being 150 mm and the inner and outer diameters thereof being 14 mm and 16 mm. After the phosphor solution is dried on the inner wall of the synthesized quartz tube by blowing hot air, the organic material and the solvent in the phosphor solution decomposed and oxidized by high temperature baking. After the temperature of the baking temperature reach about 600 for about 6 minutes, the heating step is terminated and the quartz tube is taken out after cooling down. It is observed that the phosphor composition layer is coated on the inside wall of the quartz tube. The thickness of the phosphor composition is substantially 3 mg/cm$^2$ (about 18~22 μm) by measuring the value of the weight of the phosphor composition coated on the quartz tube dividing the inner surface of the quartz tube. Then, the quartz tube is filled with the xenon gas of 400 torr is filled and sealed. By sending an electrical discharge through the xenon gas in the quartz tube, the xenon gas is excited to emit a photon of a characteristic energy, resulting in the vacuum ultraviolet radiation. Measurements of the UV-C irradiance are conducted herein, at different electric powers (30 W and 80 W) applied to the quartz tube. The results of measurements are listed in the following table 2.

Comparative Example 2

The comparative example 2 is conducted by the procedures similar with the comparative example 1, except the amount of the aluminum oxide and the calcium pyrophosphate are changed to 0.45 g and 0.9 g respectively. Those similar parts are not described redundantly.

Comparative Example 3

The comparative example 3 is conducted by the procedures similar with the comparative example 1, except altering the binding agent to nano-silica particles. Those similar parts are not described redundantly.

The measurements and the observing results of examples 1 to 2 and comparative examples 1 to 3 are listed in table 2.

TABLE 2

| No. | Phosphor | Binding agent | Phosphor solution stability (Storing time) | Phosphor composition layer uniformity | Irradiance (mW/cm2) | |
|---|---|---|---|---|---|---|
| | | | | | Input power 30 W | Input power 80 W |
| Example 1 | Phosphor encapsulated by silica | Silicone resin | >48 hrs | ⊚ | 4.3 | 6.0 |
| Example 2 | | | >48 hrs | ⊚ | 4.0 | 4.5 |
| Comparative Example 1 | Phosphor | Nano-aluminum oxide | >4 hrs | ○ | 2.3 | 3.1 |
| Comparative Example 2 | | Calcium pyrophosphate | >4 hrs | ○ | 2.6 | 3.2 |
| Comparative Example 3 | Phosphor | Silica | <4 hrs | Δ | — | — |

⊚ Great: big particles not found visually
○ Acceptable: some big particles found visually
Δ Bad: holes found visually
—: homogeneous layer could not formed and no manufacture of tube First, in the phosphor solution stability parts, it is indicated that the phosphor solution stabilities of examples 1 and 2 can be greater than 48 hours, in which precipitation of the phosphor does not occur. The phosphor solution stabilities of the comparative examples 1-3 are merely about 4 hours. Thus, use the silicone resin as binding agent in the phosphor solution is better than use the nano-aluminum oxide and the calcium pyrophosphate as binding agents in the phosphor solution. In the results of phosphor composition uniformities, in which the phosphor solution is coated on the inner wall of the quartz tube, big particles are not found visually in examples 1 and 2, but big particles or holes are found visually in comparative examples 1-3; thus, the phosphor composition of comparative examples 1-3 has poor uniformity. Moreover, no matter regardless of whether 30 W or 80 W of the electric power input of the lamp is applied, the irradiance of the lamp in examples 1 to 2 are better than that of the lamp in comparative examples 1 to 3. In comparative example 3, the phosphor, which does not process modified previously and only be added nano-silica particles as binding agent, even could not form a layer of phosphor composition. Thus, the test results, such as phosphor composition uniformity and irradiance, of the phosphor provided by the embodiment and excited by the vacuum ultraviolet are better than prior art.

According to the aforementioned description, the phosphor is modified by encapsulating with the oxide of silicon nanoparticles, and then the silicone resin is used as a binding agent to form the phosphor composition in the embodiment. Because the silicone resin absorbs little ultraviolet or vacuum ultraviolet, the phosphor could be sufficiently excited by the ultraviolet or the vacuum ultraviolet to emit other light (such as UV-A, UV-B, UV-C or visible light) when the ultraviolet or the vacuum ultraviolet reaches the phosphor composition. Accordingly, the light conversion efficiency of the phosphor of the embodiment applied to the ultraviolet, vacuum ultraviolet or visible light field can be improved. Besides, the phosphor solution which forms the phosphor composition of the embodiment has great stability, and the phosphor solution can be coated on the surface of objects uniformly. After the phosphor solution is dried, the phosphor composition is also spread uniformly on the phosphor composition layer without forming big particles or holes in the visual size. The phosphor composition of the embodiment possesses properties of not only good process ability but also well adhesion to the surface of the object. The phosphor composition of the embodiment can be applied to the fluorescent lamp or the color performance of the plasma display panel.

While the disclosure has been described by way of example and in terms of the embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A phosphor composition, comprising:
   a silicone resin; and
   a modified phosphor, the modified phosphor comprising:
   a phosphor; and
   a plurality of oxide of silicon nanoparticles adhered to the phosphor;
   wherein a weight ratio of the modified phosphor to the silicone resin is substantially between 1:0.005 and 1:0.1.

2. The phosphor composition according to claim 1, wherein the weight ratio of the modified phosphor to the silicone resin is substantially between 1:0.01 and 1:0.06.

3. The phosphor composition according to claim 1, wherein a weight ratio of the phosphor to the oxide of silicon nanoparticles is substantially between 1:0.001 and 1:0.1.

4. The phosphor composition according to claim 1, wherein the silicone resin comprises methyl silicone resin, ethyl silicone resin, propyl silicone resin or methyl phenyl silicone resin.

5. The phosphor composition according to claim 1, wherein the phosphor composition is excited by an ultraviolet or a vacuum ultraviolet to emit a light.

6. A method of modifying a phosphor, comprising:
adding a phosphor comprising $SrB_6O_{10}$:Pb, $Ca_9Y(PO_4)_7$:Pr or $LaPO_4$:Pr into a first aqueous solution and well mixing to obtain a first modified solution, a pH value of the first aqueous solution being less than or equal to 10;
mixing a plurality of oxide of silicon nanoparticles with the first modified solution to produce a second modified solution; and
drying the second modified solution to produce a modified phosphor,
wherein a weight ratio of the phosphor to the oxide of silicon nanoparticles is substantially between 1:0.001 and 1:0.1.

7. A manufacturing method of a phosphor composition, comprising:
providing a modified phosphor;
mixing the modified phosphor, and a silicone resin solution to obtain a phosphor solution, wherein a weight ratio of the modified phosphor to the silicone resin solution is substantially between 1:0.01 and 1:0.2; and
drying the phosphor solution to produce the phosphor composition.

8. The manufacturing method of the phosphor composition according to claim 7, wherein the silicone resin solution comprises a silicone resin and a first solvent.

9. The manufacturing method of the phosphor composition according to claim 8, wherein the first solvent comprises methanol, ethanol, n-propanol, isopropanol, butanol or combination thereof.

10. The manufacturing method of the phosphor composition according to claim 8, wherein the phosphor solution further comprises a nitrocellulose solution, a weight ratio of the modified phosphor to the silicone resin solution to the nitrocellulose solution is substantially between 1:0.01:0.3 and 1:0.2:2.

11. A phosphor solution, comprising:
a silicone resin solution; and
a modified phosphor, the modified phosphor comprising:
a phosphor; and
a plurality of oxide of silicon nanoparticles adhered to the phosphor;
wherein a weight ratio of the phosphor to the oxide of silicon nanoparticles is substantially between 1:0.001 and 1:0.1, a weight ratio of the modified phosphor to the silicone resin solution is substantially between 1:0.01 and 1:0.2.

12. The phosphor solution according to claim 11, wherein the phosphor solution further comprises a nitrocellulose solution, a weight ratio of the modified phosphor to the silicone resin solution to the nitrocellulose solution is substantially between 1:0.01:0.3 and 1:0.2:2.

* * * * *